United States Patent
Stählin et al.

(10) Patent No.: US 8,577,596 B2
(45) Date of Patent: Nov. 5, 2013

(54) ESTABLISHING QUALITY PARAMETERS OF A DIGITAL MAP

(75) Inventors: Ulrich Stählin, Eschborn (DE); Thomas Raste, Oberursel (DE); Andreas Kircher, Darmstadt (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 329 days.

(21) Appl. No.: 12/677,590

(22) PCT Filed: Sep. 10, 2008

(86) PCT No.: PCT/EP2008/062004
§ 371 (c)(1),
(2), (4) Date: May 11, 2010

(87) PCT Pub. No.: WO2009/037164
PCT Pub. Date: Mar. 26, 2009

(65) Prior Publication Data
US 2010/0217455 A1   Aug. 26, 2010

(30) Foreign Application Priority Data

Sep. 13, 2007  (DE) .......................... 10 2007 043 824
Sep. 10, 2008  (DE) .......................... 10 2008 046 683

(51) Int. Cl.
*G01C 21/00* (2006.01)
*G06F 7/00* (2006.01)

(52) U.S. Cl.
USPC ............................................. 701/409; 701/1

(58) Field of Classification Search
USPC ......... 701/1, 532, FOR. 115, FOR. 120, 408, 701/409, 36, 41, 45, 48
See application file for complete search history.

(56) References Cited

U.S. PATENT DOCUMENTS 7,195,250 B2 * 3/2007 Knox et al. ................. 280/5.518
2001/0056326 A1 12/2001 Kimura
2003/0125871 A1 7/2003 Cherveny et al.

FOREIGN PATENT DOCUMENTS

EP 1 674 826 A1 6/2006

OTHER PUBLICATIONS

Dik de Bruin et al., "Design and Test of a Cooperative Adaptive Cruise Control System", IEEE Intelligent Vehicles Symposium, Jun. 14-17, 2004, pp. 392-396.

\* cited by examiner

*Primary Examiner* — Drew Brown
(74) *Attorney, Agent, or Firm* — RatnerPrestia (57) ABSTRACT

A device and method for the establishment of quality parameters of a digital map. A currently determined position of the vehicle and a measured value of an attribute of this position is used to calculate a quality parameter which serves as additional information for the data of the digital map. A driver assistance system constitutes an improved aid for a driver of a vehicle, since, in addition to the data of the digital map, the driver assistance system uses the feedback information of the quality parameter.

14 Claims, 5 Drawing Sheets

ESTABLISHING QUALITY PARAMETERS OF A DIGITAL MAP

CROSS REFERENCE TO RELATED APPLICATIONS

This application is the U.S. national phase application of PCT International Phase Application No. PCT/EP2008/062004, filed Sep. 10, 2008, which claims priority to German Patent Application No. 10 2007 043 824.0, filed Sep. 13, 2007, and German Patent Application No. 10 2008 046 683.2, filed Sep. 10, 2008, the contents of such applications being incorporated by reference herein.

FIELD OF THE INVENTION

The invention relates to navigation and assistance technology for vehicles. In particular, the invention relates to a method for establishing quality parameters for a digital map, to a driver assistance system for a vehicle, to a vehicle having a driver assistance system, to a device for establishing quality parameters, to a program element and to a computer-readable medium.

BACKGROUND OF THE INVENTION

Driver assistance systems are electronic accessories in motor vehicles for assisting the driver in certain driving situations. The emphasis here is often on safety aspects, but also on increasing the driving comfort. These systems intervene semi-autonomously or autonomously in the drive, control (for example fuel system, brake system), steering or signaling devices of the vehicle, or warn the driver just before or during critical situations by means of suitable man-machine interfaces. Most driver assistance systems are at present conceived in such a way that the responsibility remains with the driver and the driver ultimately continues to be in control. In this context, digital maps are to a certain extent made available to the driver assistance systems.

The accuracy of use of digital maps in driver assistance systems depends substantially on the accuracy and reliability of the map material which is used as a basis. The method which is generally used to attempt to ensure the highest possible degree of accuracy and reliability is that the map manufacturer produces new maps as often as possible. However, in this process both relative and absolute geometric errors occur during the data collection process. Furthermore, errors are possible due to changes in the road sections as a result, for example, of new building measures between two data collection intervals. The same applies to the attributes of a specific position such as a speed limit or the permitted maximum weight of a vehicle, because incorrect data collection may also have occurred here.

SUMMARY OF THE INVENTION

An object of at least one aspect of the invention is to make available improved driver assistance systems for vehicles.

The disclosure includes a method for establishing quality parameters for a digital map, a driver assistance system for a vehicle, a vehicle having a driver assistance system, a device for establishing quality parameters, a program element and a computer-readable medium.

The described exemplary embodiments relate in equal measure to the method, to the driver assistance system, to the vehicle, to the device, to the program element and to the computer-readable medium.

It is explicitly pointed out here that in the context of the invention any communication within the vehicles can be carried out either in a cableless or cable-bound fashion.

According to one exemplary embodiment of the invention, a method for establishing quality parameters for a digital map is disclosed. The method here has the following steps: detection of a position of a vehicle, detection of a current measured value of an attribute of the position, extraction of a stored value of the attribute of the position of the vehicle from the digital map. Furthermore, the method has the steps of transmission of the measured value and of the extracted value as a value pair to an evaluation unit and generation of a quality parameter of the attribute of the position on the basis of the value pair by the evaluation unit.

In other words, the method can be used to permit evaluation of the correctness of the map material of the digital map. This method makes it possible to generate quality parameters which are produced independently of the original collection of the data of the digital map. As a result it is possible to provide redundancy in a driver assistance system since the driver assistance system uses not only the digital map data for its operation but also the generated quality parameter. In this context it is, of course, possible and desirable for a plurality of quality parameters to be used for many different attributes of many different positions of the map. As a result, the accuracy and correctness of the driver assistance system are increased. The quality parameter is used to make available feedback for the digital map. This redundancy in the system may be necessary for certain safety applications.

It is of decisive significance here that a deviation between the digital map, which is represented by the extracted value, and the reality, which is represented by the measured value, is calculated. The quality parameter is determined by the evaluation unit on the basis of this deviation. The quality parameter can then be fed back to the digital map in the vehicle or to the location at which the digital is stored centrally.

In this context, the position of the vehicle can be detected, for example, by a position-determining unit such as a GPS device. However, any other technology can be used to determine the position. The detection of a current measured value of an attribute can take place by means of a measured unit such as, for example, a camera, a radar system, a movement sensor or any other sensor of the vehicle. In this context, the term attribute is understood to be a measurement variable such as, for example, the speed limit which is to be complied with at this position. However, lane information such as, for example number of lanes, one-way road information, direction of travel information, priority information or else turning authorizations are also exemplary attributes of a position. For example, attributes such as road signs can be registered by detection by camera. A value of the number-of-lane attribute may be, for example, 3.

After the position of the vehicle has been detected, a map matching algorithm can be used to reproduce the detected position on the digital map. For example, the position P1 is detected by the position-determining unit. For this purpose, the stored value of the number-of-lanes attribute is extracted from the digital map at the position P1 with the map matching algorithm. The attribute may be, for example 3. The measured value of a camera which is current at the position P1 by virtue of a sensor of the vehicle may be, for example, 2. In the text which follows, the value pair measured value 2 and extracted value 3 will therefore be transmitted to the evaluation unit. In this context, the evaluation unit can apply any desired mathematical algorithm in order to calculate these two corresponding values to form a quality parameter. For example, the difference between the two values or a quotient thereof can be formed. It is of decisive significance here that the attributes have location-related values.

Furthermore, the digital map can either be stored in the vehicle or else be retrieved centrally on demand. The location-bound relevant attribute is extracted from the map information of the digital map using a map matching algorithm which is used to represent the detected position on the digital. Furthermore, the evaluation unit may be, for example, a computing unit within the vehicle, which computing unit determines the quality parameter autonomously. Said quality parameter can be transmitted by means of close-range communication to other vehicles (car-to-car communication), wherein the driver assistance systems of the other vehicles can use the transmitted quality parameters. Improved help for the driver with more up-to-date information can result from this. In other words, a self-organizing network can be produced by means of these quality parameters and the combination of the car-to-car communication, as a result of which improved information is made available to the driver assistance systems.

According to a further exemplary embodiment of the invention, the evaluation unit is a central evaluation unit.

For example, the central evaluation unit may be a central server. In this context, the vehicle transmits, by means of a transmission unit, the value pair to the central evaluation unit and the latter determines the quality parameter on the basis of the value pair. The quality parameter can be transmitted to the respective vehicle and also to another previously uninvolved vehicle, by means of a back-transmission unit of the central evaluation unit. As a result, the driver assistance system of the vehicle can use both the digital map data and the quality parameter as the basis for a decision. However, back-transmission of the quality parameter into a database in which the digital map is stored is also possible. However, such a central server is not necessary. The evaluation can also take place within the vehicle or within another vehicle. For example, the different vehicles can exchange their value pairs and/or their self-determined quality parameters with one another via vehicle-to-vehicle communication.

According to a further exemplary embodiment of the invention, the method also has the step of storage of the quality parameter as additional information for the digital map.

It is possible here to store the quality parameter at a storage location separately from the digital map in a vehicle. It is likewise possible to store the quality parameter separately at a central storage point outside the vehicle and to make it available for the driver assistance system. It is likewise possible to store the quality parameter directly and immediately in the file of the digital map both in the vehicle and at a central storage device.

According to a further exemplary embodiment of the invention, the method also has the following step: operation of a driver assistance system of a vehicle on the basis of the digital map in combination with the quality parameter.

It is, of course, possible and desirable here that as many quality parameters as possible of as many positions and as many attributes as possible are generated and used. This can increase the accuracy and up-to-dateness of a driver assistance system. Furthermore, the safety can be increased since the driver assistance system can decide to include only those data of the digital map which have a quality parameter which exceeds a necessary limiting value. A minimum quality level of the information used is therefore ensured.

According to a further exemplary embodiment of the invention, the extraction of a stored value of the attribute of the position of the vehicle from a digital map takes place by means of a map matching algorithm.

By using a map matching algorithm, a possible error during the detection of the position of the vehicle by, for example, a GPS unit of the vehicle can be reduced. The map matching algorithm therefore serves to represent the detected position of the vehicle on the digital map.

According to a further exemplary embodiment of the invention, the method also has the steps: generation of further value pairs of the attribute of the position by further vehicles and transmission of the further value pairs of the attribute of the position to the evaluation unit by the further vehicles. In this context, the generation of the quality parameter takes place on the basis of the respective values of the further value pairs.

In other words, it is therefore possible to make available a central system by means of which each individual vehicle transmits its measured values and extracted values as a value pair to a central unit such as a server. The central evaluation unit registers all the incoming feedback information of the individual vehicles and calculates a central quality parameter. In this context, the calculation takes place on the basis of the respective values of the further value pairs. In this context, the central evaluation unit can use each mathematical algorithm which employs the deviation between the measured value and the extracted value as a basis for the calculation of the quality parameter. For example, the difference between the two values or the quotient of the two values can be determined. By virtue of the central determination of the quality parameter and the plurality of the transmitted value pairs of an attribute of a position it is possible for the central evaluation unit to perform filtering and to reject incorrect measurements. On the basis of statistical averaging by the evaluation unit, an improved quality parameter can be made available for the respective digital maps or the respective driver assistance systems of the respective vehicles.

According to a further exemplary embodiment of the invention, the method also has the step: adaptation of an already generated and stored quality parameter on the basis of a number of additionally transmitted value pairs or on the basis of a predefined first limiting value of a difference between values of an additionally transmitted value pair.

In other words, the evaluation unit can perform adaptation of already existing stored quality parameters. The response to the question whether an already stored quality parameter is to be updated, can therefore be made dependent on the number of value pairs received afterwards at the evaluation unit. It is therefore possible, for example, for the user to predefine that, in the event of more than five additional value pairs being received at the evaluation unit, a new quality parameter is calculated and made available to the vehicles or the driver assistance systems as a new quality parameter of this position and of this attribute. Furthermore, it is possible for an already stored quality parameter to be updated if the difference between an additionally received value pair exceeds a predefined limiting value.

According to a further exemplary embodiment of the invention, the method also has the steps of evaluation of an information item of the digital map by a driver assistance system using the quality parameter, wherein the driver assistance system only uses the quality parameter starting from a predefined, second limiting value.

For example, the driver assistance system cannot use the information of the digital map, in other words cannot permit use, until the quality parameter has been confirmed at least x times (for example 3 times) at the necessary position, x representing the predefined second limiting value. In this context, "confirm x times" is understood to mean that the quality parameter is generated independently x times by the evaluation unit. In another exemplary embodiment, the evaluation can be carried out by the driver assistance system in such a way that the driver assistance system uses only information in which quality parameters are present from a central control point, and these quality parameters lie within a certain tolerance range. In this context, the tolerance range can be determined by the second predefined limiting value. It is also possible for the driver assistance system to use, in the evaluation, only information of the digital map in which the vehicle itself has determined a corresponding quality parameter at least x times (for example once) and this quality parameter lies within a tolerance range. In this context, x can be the second predefined limiting value, and this tolerance range of this exemplary embodiment can be determined by a third predefined limiting value. If a vehicle has already repeatedly generated quality parameters which are in the vicinity of the required position, and if these quality parameters are all within a tolerance range, the driver assistance system can likewise decide to use the information of the digital map even if there are not yet any quality parameters present at the current position. In this context, this tolerance range can be determined by the predefined second limiting value. Likewise, by using a plurality of limiting values it is possible for a tolerance range to be delimited in the upward and downward directions and determined. The user of the vehicle himself can always predefine every limiting value here within the context of the invention. However, the limiting values can also be predefined by a central point such as, for example, the central evaluation unit.

For safety applications in the vehicle it may be necessary for there to be redundancy of the information which the driver assistance system uses. By means of the method it is possible to make available not only the digital map data but also the feedback information of the quality parameter to the driver assistance system. The driver assistance system is thus able to decide autonomously whether it includes and uses the existing map information. This decision can be made dependent on whether the quality parameter exceeds a specific second limiting value. It is therefore possible, for example, for the user to define that only information of attributes of the digital map which has a quality parameter which is, for example, greater than 0.8 is used. It is therefore possible to ensure that the driver assistance system only uses information of the digital map which has firstly also been checked at least once, and secondly which ensures a minimum quality of the information.

According to a further exemplary embodiment of the invention, the invention also has the steps: collection of longitudinal-dynamics operating instructions at longitudinal-dynamics actuators in a vehicle by a collecting unit of a control system, and generation of new, central operating instructions for the longitudinal-dynamics actuators by a computing unit of the control system.

In this context, this exemplary embodiment of the invention can also exist alone, and it is not necessary to establish a quality parameter for this purpose.

According to a further exemplary embodiment of the invention, a control system for controlling a drive train of a vehicle is specified, wherein the control system has: a controller, at least one collecting unit and a computing unit, wherein longitudinal-dynamics operating instructions for longitudinal-dynamics actuators of the vehicle can be fed to the controller via the collecting unit; and wherein the computing unit is designed to generate new, central operating instructions for the longitudinal-dynamics actuators.

In this context, this exemplary embodiment of the invention can also exist alone, and it is not necessary to establish a quality parameter for this purpose.

In this context, in the case of a hybrid vehicle the controller can be embodied as a hybrid controller.

Using a central unit, which is represented by the control system, permits all the longitudinal-dynamics interventions of possible vehicle systems to be collected at a central point. Furthermore, a computing unit of the control system can combine the received longitudinal-dynamics operating instructions of the various vehicle systems and output them to form new central operating instructions for the longitudinal-dynamics actuators such as, for example, the brake system, internal combustion engine, transmission or electric motor. In this context, for example overall optimization of consumption can be carried out. This makes it possible to avoid a situation in which the individual vehicle systems such as, for example, advanced driver assistant systems (ADAS) or else global chassis control (GCC) systems implement their interventions into the longitudinal-dynamics actuators independently of one another.

According to a further exemplary embodiment of the invention, the method also has the step: combination of various environmental data of the vehicle by means of a combination module to form a representation of the environment (that is to say a representation of the surroundings of the vehicle), wherein the generation of the new, central operating instructions is based on the representation of the environment in a predictive fashion.

In other words, this provides a method for making available an architecture for controlling a drive train of a vehicle, in which method a combination module combines the collection of all the input data from different sensors and the information of the digital map and merges them to form a comprehensive representation of the environment. Systems such as ADAS or else GCC output their longitudinal-dynamics operating instructions on the basis of this representation of the environment. These longitudinal-dynamics operating instructions of the systems and those of the driver via, for example, the accelerator pedal are collected by the control system and newly calculated by a computing unit as a function of the driving situation and distributed among the existing actuators such as, for example, the brake, electric motor, transmission and internal combustion engine. The information from the combination module is also made available to the control system in order to permit predictive closed-loop and open-loop control. The combination module therefore channels any environmental data which can be used to generate the representation of the environment.

In this context, the controller of the control system may be, for example, a hybrid controller which takes into account the information of the representation of the environment such as, for example, the future route dynamics in a predictive fashion in its calculation of the new central operating instructions for the longitudinal-dynamics actuators. As a result, it is possible to optimize not only the overall optimization of consumption but also the interaction between the electric motor and the internal combustion engine. The hybrid controller can therefore, for example, still connect the electric motor to an internal combustion engine just before a summit when traveling up hill when the acceleration is to be at a maximum despite the battery of the electric motor threatening to run out of power. This is because the combination module provides the hybrid controller with the information that in the near future there will be a possibility of charging the battery by means of the imminent downhill travel. In this context, the driver can specify a preference sequence with which these different objectives, such as optimization of consumption or maximum acceleration, are to be implemented.

According to a further exemplary embodiment of the invention, the environmental data are selected from the group composed of measurement data of the measuring unit of the vehicle, statistical information of a digital map, dynamic information of a digital map, information from a communication of the vehicle with another vehicle, and information from a communication of the vehicle with an infrastructure element.

Owing to the plurality of information channels which feed information to the combination module, a comprehensive representation of the environment of the vehicle is produced. Since the control system uses this representation of the environment, improved predictive and situation-dependent control of the drive train of a vehicle can be ensured. In this context, the control system takes into account all the desired interventions by the vehicle systems and, for example, by the driver. Likewise, feedback information from the brake system to the controller is possible.

According to a further exemplary embodiment of the invention, a driver assistance system for a vehicle is specified, wherein the driver assistance system operates on the basis of a digital map in combination with a quality parameter, wherein the quality parameter is generated with a method according to one of the preceding exemplary embodiments.

According to a further exemplary embodiment of the invention, a vehicle having a driver assistance system according to the previous exemplary embodiment is specified.

According to a further exemplary embodiment of the invention, a device for establishing quality parameters of a digital map in a vehicle is specified, wherein the device has a position-determining unit, a measuring unit, a computing unit and a driver assistance system. In this context, the position-determining unit is designed to detect a position of the vehicle, and the measuring unit is designed to detect a measured value of an attribute of the position. Furthermore, the computing unit is designed to extract a stored value of the attribute of the position of the vehicle from the digital map. In this context, the measured value and the extracted value serve to calculate a quality parameter, wherein the driver assistance system is operated on the basis of the digital map in combination with the quality parameter.

It is possible here that the quality parameter is determined independently within the vehicle by, for example, a computing unit and is made available to the driver assistance system. However, it is also possible to transmit the value pair to a central server which serves as an evaluation unit. Subsequent back transmission of the quality parameter determined by the server to the vehicle or to another central point for storage of the quality parameter is possible. The device makes it possible to generate quality parameters which are independent of the original collection of the data. At the same time, redundancy is provided for the driver assistance system since the driver assistance system is provided not only with the digital map data but also with the quality parameters which are detected and generated independently thereof. This can meet a necessary condition for certain safety applications.

According to a further exemplary embodiment of the invention, a program element is specified which, when it is run on a processor, induces the processor to carry out the steps specified above.

According to a further exemplary embodiment of the invention, a computer-readable medium is specified on which a program element is stored, which program element, when it is run on a processor, induces the processor to carry out the steps specified above.

In this context, the computer program element can be, for example, part of a software package which is stored on a processor of a driver assistance system. Likewise, the computer program element can be used in a control unit or a computer unit which performs closed-loop and open-loop control of the longitudinal-dynamics actuators in combination with the controller. Furthermore, this exemplary embodiment of the invention comprises a computer program element which uses the invention from the start, and also a program element which brings about updating through an existing program for using the invention.

Furthermore it is possible for all the data mentioned in this document to be changed by means of media conversion. The term media conversion denotes generally the transfer and conversion of a file from one file format into another. The same applies to the transfer of data between different media and file systems, as well as to the transmission of data from one storage medium to another. If, for example, an emergency call is to be issued, the control unit can have recourse to the detection unit and have the current position of the vehicle communicated to it by the detection unit. For this purpose, the detection unit has, for example, a GPS receiver.

Furthermore, the term media conversion relates to the conversion of data between visual, auditory and textual formats, as well as combination formats thereof. In this context, the media-converted data can, for example, be transmitted directly to the receiver selected by the control unit. It is therefore also possible, for example, for address information to be made clear to the user of a digital map.

In addition it is to be noted that "comprising" and "having" do not preclude other elements or steps and "a" or "an" does not preclude a plurality. In addition it is to be noted that features or steps which have been described with reference to one of the above exemplary embodiments can also be used in combination with other features or steps of other exemplary embodiments of the invention described above.

Preferred exemplary embodiments of the invention will be described below with reference to the figures.

BRIEF DESCRIPTION OF THE DRAWINGS

The invention is best understood from the following detailed description when read in connection with the accompanying drawings. Included in the drawings is the following figures.

In the following descriptions of the figures, the same reference numbers are used for the same or similar elements.

The illustrations in the figures are schematic and not to scale.

DETAILED DESCRIPTION OF THE PREFERRED EMBODIMENTS

Figure 1:
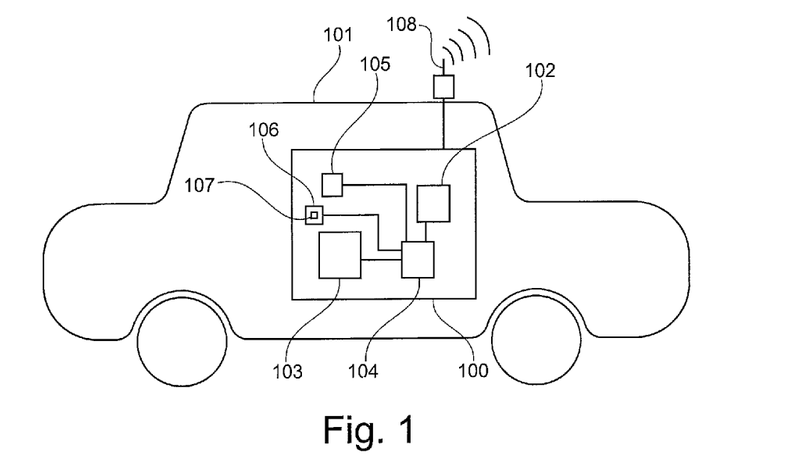
FIG. 1 shows a schematic two-dimensional illustration of a device for establishing quality parameters according to an exemplary embodiment of the invention.

FIG. 1 shows a vehicle 101 having a device 100 for establishing quality parameters for a driver assistance system 105. The device 100 has here, in addition to the driver assistance system, a position-determining unit 102 which can be embodied, for example, as a GPS receiver. The measuring unit 103 can be embodied by means of a wide variety of sensors or detectors. For example, a speedometer, a spring travel sensor, an ESP sensor, an optical detector, a beam sensor, a direction sensor, a distance sensor or a steering wheel rotational angle sensor may constitute the measuring unit 103. Each communication between the individual elements in the vehicle can take place in a wireless or, if desired, wire-bound fashion. Furthermore, a computing unit 104 is present in the device 100. In this context, the computing unit is designed to extract a stored value from a digital map 107, wherein the digital map can be stored, for example, in a storage unit 106. The position-determining unit is designed to detect a position of the vehicle, and the measuring unit is designed to detect a measured value of an attribute of the position of the vehicle. In this context, the measured value and the extracted value serve to calculate a quality parameter. In this context, it is possible for the value pair, comprising the measured value and extracted value, to be transmitted via a transceiver unit 108 to an evaluation unit which determines the quality parameter. However, independent determination of the quality parameter on the basis of the measured value and of the extracted value by the device 100 is also possible. Furthermore, the driver assistance system 106 of the device is operated on the basis of the digital map in combination with the generated quality parameter. In this context, any mathematical algorithm which uses the measured value and the extracted value to determine the quality parameter can be used to calculate the quality parameter. For example, the difference between the two values or else a quotient of the two values can be used to calculate the quality parameter.

In other words, it is, for example, possible to use the device to derive information about speed limitation from the speed at which the vehicle is travelling in a certain region or at a certain position, but in this context it is also possible to use a traffic jam detection means in order to be able to differentiate traffic jams from speed restrictions. Lane information such as the number of lanes which are detected by means of a camera may serve as further examples of attributes of a position of the vehicle. Information about one-way roads, travel direction information, priority information or turning authorizations are also exemplary attributes of a position. In other words, the device makes it possible to generate quality parameters which are independent of the original collection of the data. This provides redundancy in the driver assistance system which may be necessary for certain safety applications.

Figure 2:
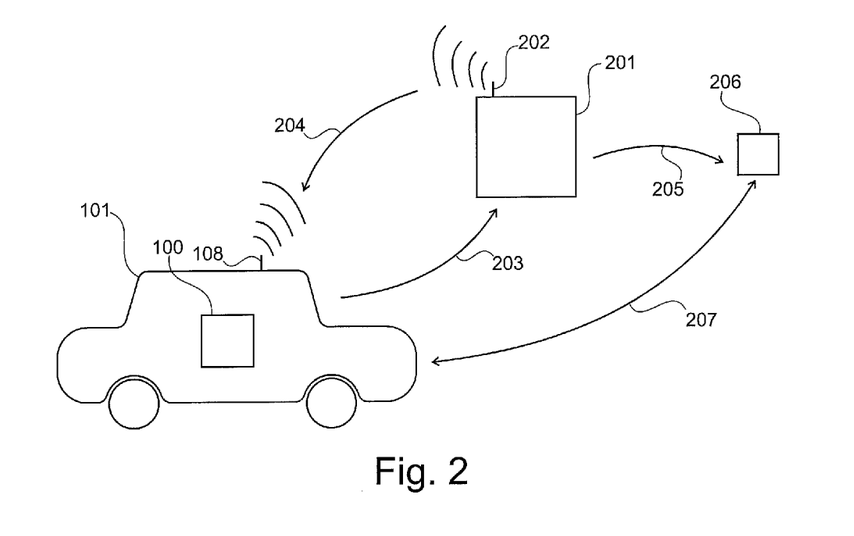
FIG. 2 shows a further schematic two-dimensional illustration of a device for establishing quality parameters according to an exemplary embodiment of the invention.

FIG. 2 shows a vehicle 101 with an inventive device 100 for establishing quality parameters, wherein the vehicle also has a transmission unit 108. Furthermore, a central evaluation unit 201 is shown which may be embodied, for example, by a server. This evaluation unit also has a transceiver 202 via which the vehicle 101 and the evaluation unit 201 can communicate. 203 shows the transmission of the value pair comprising the measured value and extracted value to the central evaluation unit. In contrast, 204 shows the back transmission of the calculated quality parameter from the central evaluation unit to the vehicle. Likewise it is possible that the central evaluation unit transmits, to a central storage unit 206, the quality parameter which is generated by said central evaluation unit. This is shown by the arrow 205. The quality parameter can be stored in the central storage unit 206, and the vehicle accesses the quality parameter stored there by means of a communication 207.

Figure 3:
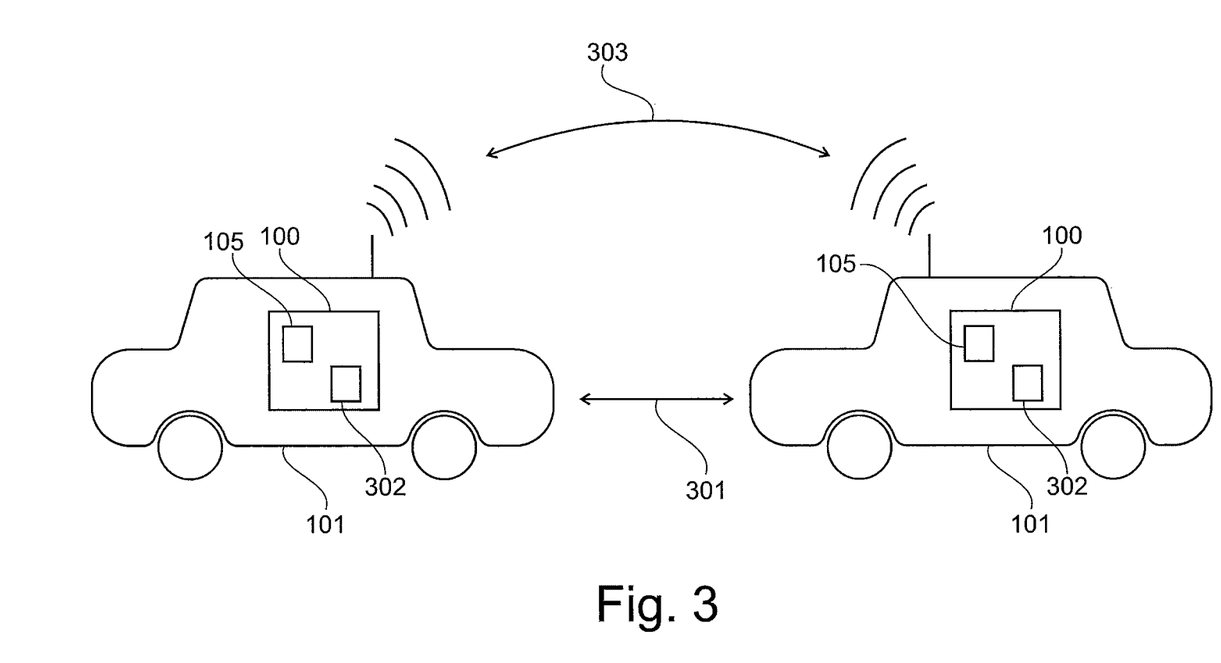
FIG. 3 shows a further schematic two-dimensional illustration of a device for establishing quality parameters according to an exemplary embodiment of the invention.

FIG. 3 shows a vehicle-to-vehicle communication 301 between two vehicles 101. Here, the vehicles each have an inventive device 100 for establishing quality parameters for the respective driver assistance systems 105. Here, the devices also each have computing units (evaluation units) 302 which can serve at the same time as individual evaluation units in the vehicle. As a result, each evaluation unit 302 can calculate quality parameters itself and subsequently also distribute them by means of reciprocal transmission 301 of the respective quality parameters from vehicle to vehicle. In other words, this provides a self-organizing network of vehicles which themselves establish quality parameters and make these quality parameters available to all other vehicles in their reception range. This provides improved use of the respective driver assistance systems. As a result, there may be a higher level of reliability of the correctness of the data, which can lead to a time saving for the driver.

Figure 4:
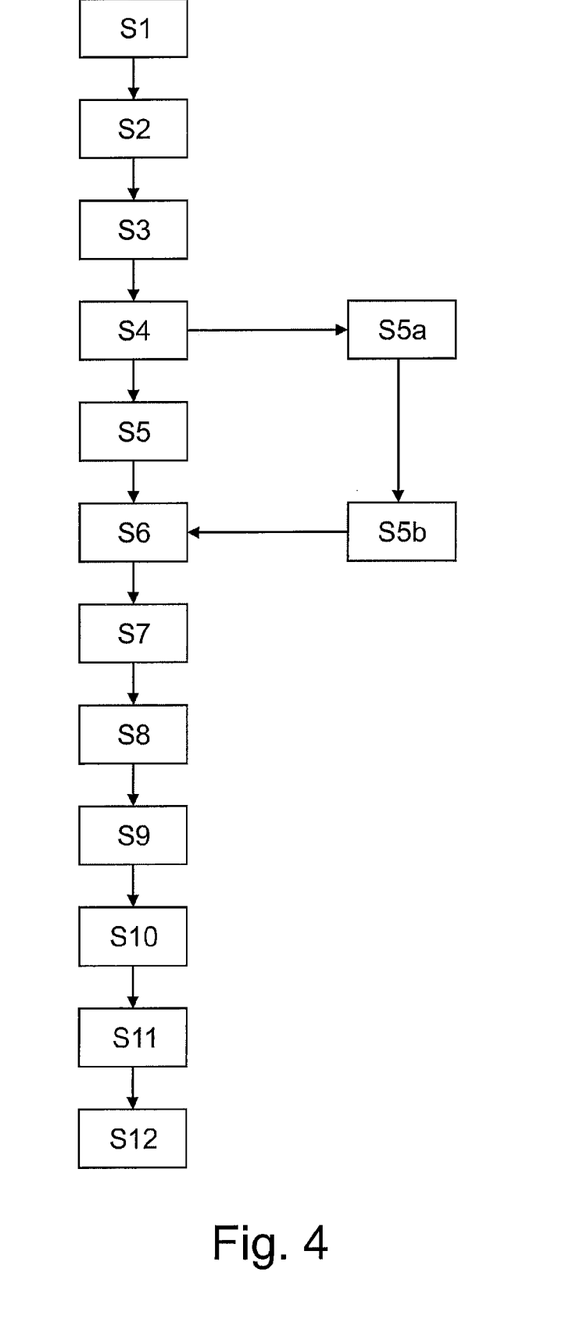
FIG. 4 shows a flowchart of method steps according to an exemplary embodiment of the invention.

FIG. 4 shows a flowchart of a method for establishing quality parameters of a digital map for driver assistance systems in a vehicle. In step S1, the position of the vehicle is detected, and in step S2 a current measured value of an attribute of the position of the vehicle is detected. In step S3 the stored value of the attribute of the position of the vehicle is extracted from the digital map, and in step S4 the measured value and the extracted value are transmitted as a value pair to an evaluation unit. Then, by means of step S5, a quality parameter of the attribute of the position is generated on the basis of the value pair by the evaluation unit. In order to obtain the largest possible amount of feedback information about an attribute of a position, it is alternatively possible for step S5a to take place, in which further value pairs of the attribute of the position are generated by further vehicles. In a further step S5b, the further value pairs of the attribute of the position are transmitted to the evaluation unit by the further vehicles, wherein the generation of the quality parameter takes place on the basis of the respective values of the further value pairs. In step S6 the quality parameter is stored as additional information for the digital map. In step S7, the driver assistance system is operated on the basis of the digital map in combination with the quality parameter. In step S8 an already generated and stored quality parameter is adapted to a difference between values of an additionally transmitted value pair on the basis of a number of additionally transmitted value pairs or on the basis of a predefined first limiting value. In step S9 a driver assistance system evaluates information of a digital map using the quality parameter, wherein the driver assistance system only uses the quality parameter starting from a predefined second limiting value longitudinal-dynamics actuators in a vehicle by a collecting unit of a control system. In step S10, longitudinal-dynamics operating instructions are collected at subsequent step S11, a computing unit of the control system generates new, central operating instructions for the longitudinal-dynamics actuators of the vehicle. In step S12, a combination module combines various environmental data of the vehicle a representation of the environment, wherein the generation of the new central operating instructions is based on the representation of the environment in a predictive fashion. By using this method it is possible to generate quality parameters which are independent of the original collection of the data of the digital map. As a result, redundancy, collection of the data and feedback by quality parameters are implemented in the system.

Figure 5:
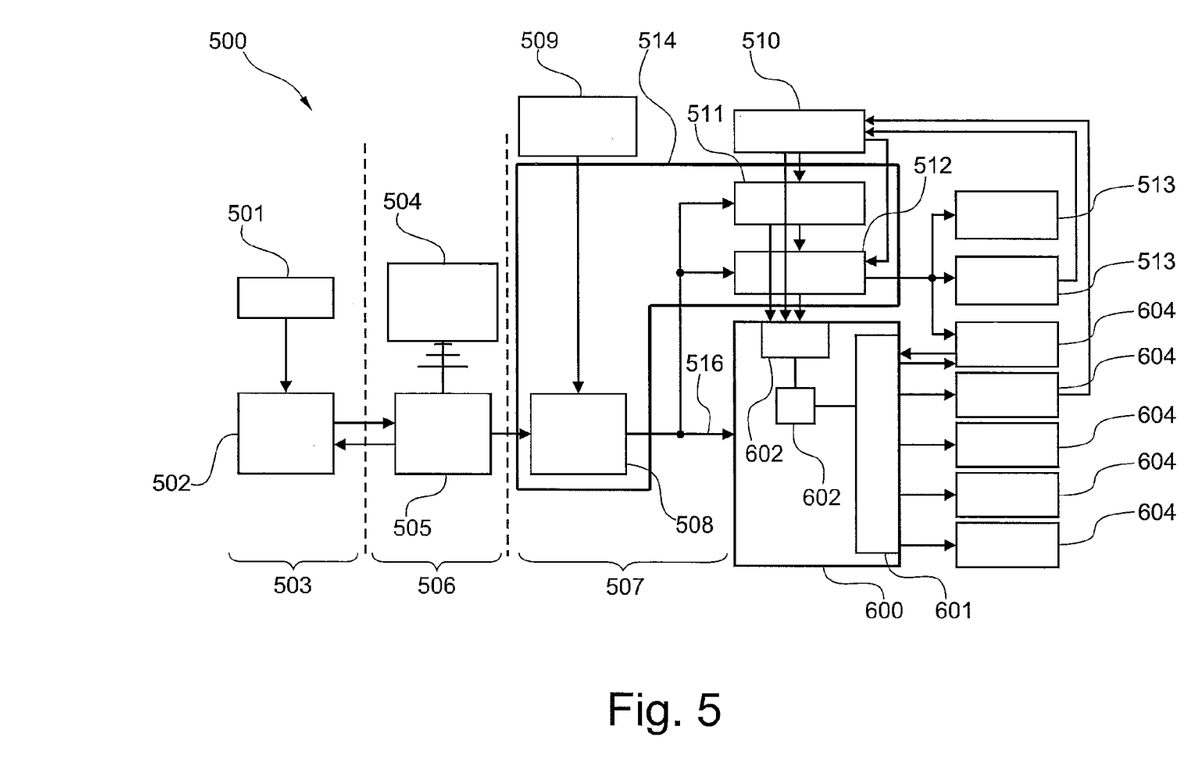
FIG. 5 shows architecture for controlling a drive train of a vehicle according to an exemplary embodiment of the invention.

FIG. 5 shows an architecture 500 for the control of a drive train of a vehicle. A digital map 501 and a first computing unit 502 are shown here. The latter are located in an information region 503 which does not need to be subject to any special safety restrictions, for example. A safety-relevant region 506 also comprises a telematic control unit 505, to which safety-relevant data 504 such as, for example, GPS, TCM, RTTI, FCD and C2X data can be made available. The combination module 508, which establishes a representation of the environment from various environmental data of the vehicle, is located in a region 507, which can be secured with a safety standard such as, for example, SIL3. In this context, the environmental data can be selected from the group composed of measurement data of the measuring unit of the vehicle, statistical information of a digital map, dynamic information of a digital map, information from a communication of the vehicle with another vehicle, and information from a communication of the vehicle with an infrastructure element. The measuring unit is denoted by 509 here.

Figure 6:
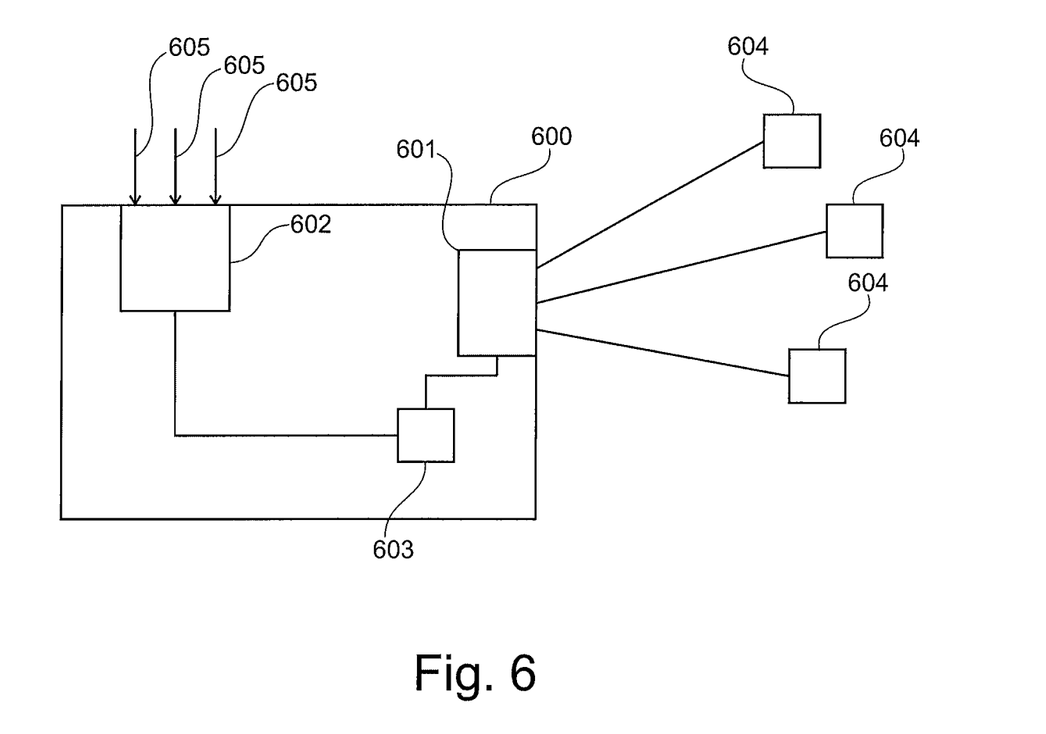
FIG. 6 shows a control system for controlling a drive train of a vehicle according to an exemplary embodiment of the invention.

Furthermore, the arrow 516 shows how the established representation of the environment is made available to the control system 600. The control system 600 comprises here a controller 601, a collecting unit 602 and a computing unit 603. This computing unit may be embodied, for example, as a CPU. In this context, the longitudinal-dynamics operating instructions can be fed from vehicle systems 511 and 512 to the collecting unit of the control system. Likewise, interventions by the driver 510, which relate to dynamic actuators, can be fed to the collecting point. In this context, the longitudinal-dynamics operating instructions at longitudinal-dynamics actuators of the vehicle can be fed to the controller via the collecting unit, and the computing unit is designed to generate new central operating instructions for the longitudinal-dynamics actuators. In this context, the longitudinal-dynamics actuators are denoted by 604. The latter are elements of the drive train of the vehicle and can be embodied, for example, as a brake, electric motor and internal combustion engine, but also as a transmission. Likewise, other vehicle systems 513 are shown. The region 514 describes a control unit for the safety-relevant region.

In other words, an overall, comprehensive and predictive combination of longitudinal-dynamics operating instructions can be carried out by means of the combination module 108 and the control system 600 to form new, centrally determined, longitudinal-dynamics operating instructions for the actuators. In this context it is possible, for example, for distribution which is optimum in terms of consumption, distribution which maximizes acceleration, distribution which optimizes braking force or distribution which is dependent on the state of the battery to be predefined by the controller as a condition or target of the control process.

FIG. 6 shows a control system 600 which has a controller 601 and a collecting unit 602. Longitudinal-dynamics operating instructions 605 from various systems or else longitudinal-dynamics operating instructions 605 from the driver can be fed to this collecting unit 602. These instructions are collected and fed to a computing unit 603 which passes on new central operating instructions to the controller 601, which performs open-loop and closed-loop control of the actuators of the drive train of the vehicle 604. In this context, the actuators may be, for example, the transmission, the brakes, the electric motor and the internal combustion engine.

The invention claimed is:

1. A method for establishing quality parameters for a digital map, the method having the steps:
    detecting a position of a vehicle;
    detecting a current measured value of an attribute of the position;
    extracting a stored value of the attribute of the position of the vehicle from the digital map;
    transmitting the measured value and the extracted stored value as a value pair to an evaluation unit; and
    generating, with the evaluation unit, a quality parameter of the attribute of the position on the basis of the value pair; and.
    evaluating, by a driver assistance system located in the vehicle, an information item of the digital map by comparing the quality parameter to a quality limiting value;
    wherein the driver assistance system located in the vehicle:
        uses the information item for controlling the vehicle when the comparison indicates that the quality parameter is greater than the quality limiting value, and
        does not use the information item for controlling the vehicle when the comparison indicates that the quality parameter is less than or equal to the quality limiting value.

2. The method as claimed in claim 1,
    wherein the evaluation unit is a central evaluation unit.

3. The method as claimed in claim 1, further comprising storing the quality parameter as additional information for the digital map.

4. The method as claimed in claim 1, further comprising operating a driver assistance system of the vehicle on the basis of the digital map in combination with the quality parameter.

5. The method as claimed in claim 1,
    wherein the stored value is extracted by means of a map matching algorithm.

6. The method as claimed in claim 1, further comprising generating additional value pairs of the attribute of the position by additional vehicles;
    transmitting the additional value pairs of the attribute of the position to the evaluation unit by the additional vehicles;
    wherein generating the quality parameter is based on the respective values of the further value pairs.

7. The method as claimed in claim 1, further comprising adapting an already generated and stored quality parameter on the basis of a number of additionally transmitted value pairs or on the basis of an upward transgression of a predefined first limiting value of a difference between values of an additionally transmitted value pair.

8. The method as claimed in claim 1, further comprising collecting longitudinal-dynamics operating instructions at longitudinal-dynamics actuators in a vehicle by a collecting unit of a control system;
    generating new, central operating instructions for the longitudinal-dynamics actuators by a computing unit of the control system.

9. The method as claimed in claim 8, further comprising combining various environmental data of the vehicle by means of a combination module to form a representation of the environment; and
    wherein the generating new, central operating instructions is based on the representation of the environment in a predictive fashion.

10. The method as claimed in claim 9,
    wherein the environmental data is selected from the group comprising: measurement data of the measuring unit of the vehicle, statistical information of a digital map, dynamic information of a digital map, information from a communication of the vehicle with another vehicle, and information from a communication of the vehicle with an infrastructure element.

11. A driver assistance system located in a vehicle, including:
    a processor located in the vehicle:
        detecting a position of a vehicle,
        detecting a current measured value of an attribute of the position, and
        extracting a stored value of the attribute of the position of the vehicle from the digital map; and
    a transmitter transmitting the measured value and the extracted stored value as a value pair to an evaluation unit, the evaluation unit generating a quality parameter of the attribute of the position on the basis of the value pair;
    wherein the processor of the driver assistance system evaluates an information item of the digital map by comparing the quality parameter to a quality limiting value, and the driver assistance system located in the vehicle:
        uses the information item for controlling the vehicle when the comparison indicates that the quality parameter is greater than the quality limiting value, and
        does not use the information item for controlling the vehicle when the comparison indicates that the quality parameter is less than or equal to the quality limiting value 12. A vehicle having a driver assistance system as claimed in claim 11.

13. A device for establishing quality parameters of a digital map in a vehicle, wherein the device comprises:
    a position-determining unit configured to detect a position of the vehicle;
    a measuring unit configured to detect a measured value of an attribute of the position;
    a computing unit configured to extract a stored value of the attribute of the position of the vehicle from the digital map; and
    a driver assistance system located in the vehicle;
    wherein the measured value and the extracted value serve to calculate a quality parameter;
    wherein the driver assistance system located in the vehicle evaluates and information item of the digital map by comparing the quality parameter to a quality limiting value; and
    wherein the driver assistance system located in the vehicle:
        uses the information item for controlling the vehicle when the comparison indicates that the quality parameter is greater than the quality limiting value, and
        does not use the information item for controlling the vehicle when the comparison indicates that the quality parameter is less than or equal to the quality limiting value.

14. A non-transitory computer-readable medium on which a program element is stored, which program element, when executed on a processor, instructs the processor to carry out the following steps:
    detect a position of a vehicle;
    detect a current measured value of an attribute of the position;
    extract a stored value of the attribute of the position of the vehicle from the digital map;
    transmit the measured value and of the extracted value as a value pair to an evaluation unit; and
    generate a quality parameter of the attribute of the position on the basis of the value pair by the evaluation unit;
    evaluate, by a driver assistance system located in the vehicle, an information item of the digital map by comparing the quality parameter to a quality limiting value; and
    wherein the driver assistance system located in the vehicle:
        uses the information item for controlling the vehicle when the comparison indicates that the quality parameter is greater than the quality limiting value, and
        does not use the information item for controlling the vehicle when the comparison indicates that the quality parameter is less than or equal to the quality limiting value.

* * * * *

UNITED STATES PATENT AND TRADEMARK OFFICE
CERTIFICATE OF CORRECTION

PATENT NO. : 8,577,596 B2  
APPLICATION NO. : 12/677590  
DATED : November 5, 2013  
INVENTOR(S) : Stählin et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 475 days.

Signed and Sealed this
Twenty-second Day of September, 2015

Michelle K. Lee
*Director of the United States Patent and Trademark Office*